United States Patent Office 3,000,848
Patented Sept. 19, 1961

3,000,848
COMPOSITION COMPRISING BIS(2,3-EPOXYCYCLOPENTYL) ETHER, A POLYCARBOXYLIC ACID ANHYDRIDE AND A POLYOL, AND CURED PRODUCT THEREOF
Charles W. McGary, Jr., and Charles T. Patrick, Jr., South Charleston, W. Va., assignors to Union Carbide Corporation, a corporation of New York
No Drawing. Filed Dec. 20, 1956, Ser. No. 629,475
9 Claims. (Cl. 260—42)

This invention relates to curable epoxide compositions and resins made therefrom. More particularly, this invention relates to curable compositions comprising bis-(2,3-epoxycyclopentyl) ether, polycarboxylic acid anhydrides and polyols and resins made therefrom.

Our curable compositions are low viscosity liquids at temperatures ranging upwards from room temperature. These compositions are compatible with a wide variety of fillers and pigments which may be employed therein, if desired, to adjust the composition viscosity and at the same time enhance the physical properties of resins formed therefrom. These compositions can be easily handled in such resin-forming applications as coating, bonding, laminating, molding, casting, potting and the like, without the need of solvents or diluents although such solvents or diluents can be used, if desired. In casting applications, our compositions can be made to fill small intricacies of molds without applying high pressures or heating to high temperatures. In coating applications, they can be easily spread, brushed, or sprayed on surfaces by the many techniques available to the paint, lacquer and varnish industries. These curable compositions undergo negligible shrinkage when cured and are particularly useful in bonding, casting, molding and potting wherein undue shrinkage is particularly undesirable. Our compositions can be easily prepared using low temperatures at which no gelation occurs during preparation. However, they can be cured rapidly at higher temperatures. The pot-lives of our compositions can be controlled, as desired. These compositions can be made with relatively short pot-lives, of the order of a few minutes, with relatively long pot-lives, of the order of several hours or of several days, or with pot-lives of intermediate duration, as desired.

Our resins are transparent and water-resistant. They can be made as hard, rigid infusible products, as tough, flexible, infusible products or as products having intermediate degrees of hardness and rigidity or toughness and flexibility, as desired. These resins can be machined to desired shapes and configurations and can be polished to provide appealing finishes. They can be made as infusible products which are resistant to most organic solvents. Our resins can also be made as products having high heat distortion values, and are capable of sustaining heavy loads at high temperatures. In accordance with our invention, resins having combinations of any one or several of these useful properties can be produced.

Our curable compositions can be made by mixing bis-(2,3-epoxycyclopentyl) ether with a polycarboxylic acid anhydride and a polyol. Bis(2,3-epoxycyclopentyl) ether is a liquid having a viscosity of about 28 centipoises at about 27° C. In making homogeneous compositions it is advantageous to raise the temperature of the ether, anhydride and polyol to the melting point of the highest melting component. Homogeneous compositions with liquid polyols and solid polycarboxylic acid anhydrides can be advantageously obtained by heating the anhydride to at least its melting point and adding it to bis(2,3-epoxycyclopentyl) ether and polyol, by heating a mixture of the ether, the polyol and anhydride to at least the melting point of the anhydride or by any other sequence which also involves the transformation of the anhydride to liquid form. Similarly, homogeneous compositions can be advantageously obtained with solid polyols by first heating them to at least their melting points. Stirring aids the formation of a homogeneous composition.

Acidic and basic catalysts can be added, if desired, to speed the rate of cure. Catalysts in amounts ranging up to 5.0 weight percent based on the weight of bis(2,3-epoxycyclopentyl) ether can be added at this point, at any time prior to curing or not at all, as desired. Higher catalyst concentrations above this range are also effective, although concentrations of 5.0 weight percent and below have been found to be adequate. Catalyst concentrations of 0.001 to 5.0 weight percent based on the weight of bis(2,3-epoxycyclopentyl) ether are particularly preferred. This composition then can be cooled to room temperature and stored for future use, if desired, or used immediately. Other polyfunctional materials also may be incorporated into our curable compositions. Such polyfunctional materials include other polyepoxides, e.g., polyglycidyl ethers of polyhydric phenols and the like, low molecular weight urea-formaldehyde or phenol-formaldehyde polymers and the like. Many variations in the physical properties of our resins can be obtained by employing such other polyfunctional materials in our curable compositions.

Curing can be carried out by maintaining the curable compositions at temperatures from 50° C. to 250° C. Temperatures higher than 250° C. can be used, although some discoloration which may not be desired in the resin may result. The time for effecting a complete cure can be varied from several minutes to several hours.

It has been found that our compositions which contain difunctional polycarboxylic acid anhydrides, i.e., anhydrides having two carboxy equivalents, and difunctional polyols, i.e., polyols having two hydroxyl equivalents tend to form more flexible resins when cured than compositions containing anhydrides and polyols of greater functionality. Illustratively, a tough resin having a Barcol hardness of 48 was obtained in Example 15, hereinafter set forth, from a composition containing a difunctional anhydride and a difunctional polyol whereas a more rigid resin having a Barcol hardness of 53 was obtained in Example 34, hereinafter presented, from a composition containing a difunctional anhydride and a trifunctional polyol. It has been found, also, that our compositions which contain polycarboxylic acid anhydrides having greater numbers of atoms in the shortest carbon chain between the carbonyl groups of the oxydicarbonyl group,

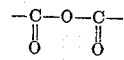

or polyols having greater numbers of atoms in the shortest chain between hydroxyl groups tend to form more flexible resins when cured than compositions containing anhydrides or polyols which have fewer atoms in said shortest chains, respectively. Illustratively, a rigid resin having a Barcol hardness of 17 was obtained in Example 1, below, from a composition containing maleic anhydride and ethylene glycol whereas a tough, flexible resin was obtained in Example 30, set forth below, from a composition containing maleic anhydride and a polyethylene glycol having an average molecular weight of about 400. Also a very rigid resin having a Barcol hardness of 53 was obtained in Example 34 from a composition containing maleic anhydride and glycerol whereas a flexible resin having a Barcol hardness of 0 was obtained in Example 35, hereinafter presented, from polyadipic and glycerol. Resins which have different degrees of flexibility or rigidity can be made in accordance with this invention to fit particular requirements, as desired, by the selection of anhydrides and polyols for use in our curable compositions from which said resins are made.

Our resins can be made as infusible products which are water-resistant and insoluble in many organic solvents. As an illustration, such infusible resins can be made from compositions which contain bis(2,3-epoxycyclopentyl) ether, polycarboxylic acid anhydrides in such amounts as provide about 0.33 to 4.00 carboxy equivalents of the anhydride for each epoxy equivalent of the ether and polyols in such amounts as provide up to about 3.00 hydroxyl equivalents of the polyol for each epoxy equivalent of the ether. Harder, infusible resins having high heat distortion values and which are also water-resistant and insoluble in most organic solvents also can be obtained from our curable compositions. For example, harder resins of this type can be made from our curable compositions which contain bis(2,3-epoxycyclopentyl) ether, polycarboxylic acid anhydrides in such amounts as to provide 0.67 to 3.00 carboxy equivalents of the anhydride for each epoxy equivalent of bis(2,3-epoxycyclopentyl) ether and polyols in such amounts as to provide from 0.16 to 1.67 hydroxyl equivalents for each epoxy equivalent of bis(2,3-epoxycyclopentyl) ether.

By the term "polyol," as used herein, is meant an organic compound having at least two hydroxyl groups which are alcoholic hydroxyl groups, phenolic hydroxyl groups or both alcoholic and phenolic hydroxyl groups. Typical polyols can be represented by the general formula.

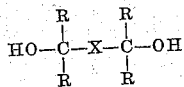

R is an alkyl group or hydrogen and can be the same or different for all R's in the molecule. X can be a single bond or a divalent group composed of a carbon atom or group of carbon atoms interconnected by single or multiple bonds and to which such groups as hydrogen, alkyl, hydroxyl, amino, cyclic groups and the like or combinations thereof can be attached. X can also represent such divalent groups as oxyalkylene or polyoxyalkylene groups. X, as a divalent group may also contain nitrogen to which other groups, for example, hydrogen, alkyl, alkanol and the like may be attached or it may represent a carbon atom group which contains sulfur. It can also represent cyclic groups, such as phenylene, cyclohexylene and the like. The R's and X together with the carbon atoms, i.e., the C's of the formula, can represent a cyclic group such as phenylene, cyclohexylene and the like. The presence of other groups, with the exception of tautomeric enolic groups, not specifically listed herein and not participating in the curing reaction is by no means harmful and, in fact, can be useful in developing special properties in our resins. Mixtures of polyols or only one polyol can be employed in our curable compositions.

Representative polyols which can be employed in our compositions are polyhydric alcohols, such as, ethylene glycol, diethylene glycol, polyethylene glycols, propylene glycol, tripropylene glycol, polypropylene glycols, polyethylenepolypropylene glycols, trimethylene glycol, butanediols, pentanediols, 2-ethyl-1,3-hexanediol, 2-methyl-2,4-pentanediol, 12,13-tetracosanediol, 2-butene-1,4-diol, 2-methoxymethyl-2,4-dimethyl-1,5-pentanediol, diethanolamine, triethanolamine, glycerol, polyglycerols, pentaerythritol, sorbitol, polyvinyl alcohols, cyclohexanediols, cyclopentanediols, inositol, trimethylolphenol, and polyhydric phenols, such as, dihydroxytoluenes, resorcinol, bis(4-hydroxyphenyl)-2,2'-propane, bis(4-hydroxyphenyl) methane, the polyhydric phenolic-formaldehyde condensation products, and the like. Polyols which are free of acetylenic unsaturation and composed of carbon, hydrogen and oxygen combined as hydroxyl oxygen or ether oxygen connecting two otherwise unconnected carbon atoms and having not more than 24 carbon atoms are preferred.

Polycarboxylic acid anhydrides useful in producing our resins can be represented by the formula:

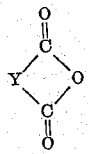

wherein Y represents two or more carbon atoms interconnected by single or double bonds and to which such groups as hydrogen, alkyl, hydroxyl, nitro, chloro, iodo, bromo, cyclic groups and the like or combinations thereof may be attached. Y can also represent groups containing carbon atoms interconnected by single or double bonds and oxydicarboxyl groups, i.e.,

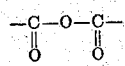

interconnecting the carbon atom groups to which such other groups as previously mentioned may be attached. Y may also represent such cyclic groups as phenylene, cyclohexylene, cyclohexenylene, and the like which may have one or more oxydicarbonyl groups attached thereto. Polycarboxylic acid anhydrides, containing other groups not specifically mentioned herein, and not taking part in the curing reaction can be used in our curable compositions without harmful effects, and, in fact, can be used to develop particular properties in our resins. One polycarboxylic acid anhydride or a mixture of two or more, as desired, can be used in our curable compositions. Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride, hexachloroendomethylenetetrahydrophthalic anhydride, hereinafter referred to as chlorendic anhydride, tetrabromophthalic anhydride, tetraiodophthalic anhydride, phthalic anhydride, 4-nitrophthalic anhydride, 1,2-napthalic anhydride, 1,8-naphthalic anhydride, 2,3-naphthalic anhydride, 1,2,4,5-benzenetetracarboxylic dianhydride, polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our curable compositions include the Diels-Alder adducts of maleic acid and aliphatic compounds having conjugated double bonds. Preferred polycarboxylic acid anhydrides are those which are soluble in bis(2,3-epoxycyclopentyl) ether at temperatures below about 250° C.

Bis(2,3-epoxycyclopentyl) ether is a liquid diepoxy dicyclic aliphatic ether having a viscosity of about 28 centipoises at 27° C. The preparation of this diepoxide involves what can be termed epoxidation, or the controlled oxidation of the double bonds of bis(2-cyclopentenyl) ether which, itself, can be made from cyclopentadiene by the successive steps of hydrochlorination and alkaline hydrolysis. More specifically, bis(2-cyclopentenyl) ether can be prepared from the reaction of cyclopentadiene with hydrogen chloride in a suitable solvent, such as, benzene, or without a solvent, for a period of about one hour at a low temperature, such as 0° C. to −15° C., thereby forming 1-chloro-2-cyclopentene. Subsequently, 1-chloro-2-cyclopentene can be subjected to alkaline hydrolysis with an aqueous solution of sodium carbonate or sodium hydroxide at a temperature of the order of 40° C. to 60° C. to form bis(2-cyclopentenyl) ether. A substantially pure bis(2-cyclopentenyl) ether then can be obtained by any suitable separation procedure, for example, fractional distillation.

Suitable epoxidizing agents for the epoxidation reaction include peracetic acid and acetaldehyde monoperacetate. The epoxidation reaction can be advantageously carried out by charging bis(2-cyclopentenyl) ether to a reaction vessel and then gradually adding the epoxidizing agent. In order to provide ease of handling and to avoid the formation of highly concentrated or crystalline peracetic acid with its attendant explosion hazard, the epoxidizing agent preferably is employed in a solvent, as for example, acetone, chloroform, methylethyl ketone, ethyl acetate, butyl acetate, and the like. The reaction can be carried out at a temperature within the range of about −25° C. to 150° C., although lower and higher temperatures may be used. However, longer reaction times are needed at the lower temperatures to produce high yields. At the higher temperatures, side reactions from undesirable materials which can be removed, however, by conventional purification procedures, such as, fractional distillation. The reaction is continued until an analysis for epoxidizing agent indicates that an amount at least sufficient to epoxidize all the double bonds of the bis(2-cyclopentenyl) ether has been consumed. In this connection it is desirable to employ an excess over the theoretical amount of peracetic acid to assure complete epoxidation. Upon discontinuance of the reaction, side-reaction products, solvent and unreacted material are removed by any convenient procedure, such as, by adding a potboiler, e.g., ethylbenzene, and stripping low-boiling materials. A liquid material, identified as bis(2,3-epoxycyclopentyl) ether, is obtained. Bis(2,3-epoxycyclopentyl) ether can be accepted as a residue product and subsequently further refined by distillation, extraction or crystallization, if desired. This product partially solidifies on standing at room temperature for 1 to 3 days which indicates the possible formation of a solid position isomer. This semi-solid bis(2,3-epoxycyclopentyl) ether can be liquefied by melting at a temperature of 30° C. to 35° C. and will remain a liquid for a period of several days at room temperatures.

Catalysts which can be employed with advantageous effects in accelerating the cure of our compositions are the basic and acidic catalysts including strong alkalis, mineral acids and metal halide Lewis acids. Typical strong alkalis include the alkali metal hydroxides, e.g., sodium hydroxide and potassium hydroxide, and quaternary ammonium compounds, e.g., benzyltrimethylammonium hydroxide, tetramethylammonium hydroxide and the like. Representative of mineral acids which can be used in speeding the formation of our resins are sulfuric acid, perchloric acid, polyphosphoric acid and the various sulfonic acids, such as, toluene sulfonic acid, benzene sulfonic acid and the like. Metal halide Lewis acids which are also effective in speeding the cure of our resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in our compositions prior to curing has been found to be desirable in order to obtain homogeneous resins and to minimize localized curing around catalyst particles. Agitation of the compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methyl-isobutyl-ketone, cyclohexanone, organic alcohols, e.g., methanol, cyclohexanol, propylene glycol and the like. The mineral acids and strong alkalis can be employed as solutions in water, whereas metal halide Lewis acid catalysts tend to decompose in water and aqueous solutions of such Lewis acids are not preferred.

Our curable compositions can be used in coatings, castings, moldings, bondings, laminates and the like in the manufacture of articles having a multitude of uses. These compositions can be colored by pigments and very appealing appearances may be imparted to articles made therefrom. Fillers can also be incorporated in our compositions so as to impart special properties to articles manufactured therefrom. Such sundry articles as buttons, combs, brush handles, structural parts for instrument cabinets and the like can be formed through the use of our curable compositions and resins. Of particular importance, are uses of our hard, tough resins of high heat distortion values in industrial applications wherein load carrying capabilities at high temperatures are required. Uses of this kind include hot fluid carrying conduits, high temperature tools and dies, minor structural parts and high temperature electrical insulation for high-speed aircraft and the like. Our polymerizable compositions are particularly useful in the manufacture of large tools as, for example, used in the automobile industries wherein the fluid nature of our compositions simplifies the construction of such tools. These compositions are particularly useful in the potting of electrical components wherein it may be desired to incorporate in the potting composition a heat conductive metal, such as, copper or aluminum.

Other useful compositions, and resins therefrom, can be made from polycarboxylic acid anhydrides, polyols and polyepoxides not otherwise mentioned herein. Resins having outstanding strength properties can be made from compositions containing polycarboxylic acid anhydrides and polyols, such as those specified herein, and dicyclopentadiene dioxide. Resins having excellent high temperature strengths can be made from compositions containing polycarboxylic acid anhydrides and polyols, such as those specified herein, and 3,4-epoxycyclohexylmethyl 3,4-epoxycyclohexanecarboxylates, e.g., 3,4-epoxy-6-methylcyclohexylmethyl 3,4-epoxy-6-methylcyclohexanecarboxylate. Still other resins having many valuable properties can be prepared from various different compositions of polycarboxylic acid anhydrides and polyols, such as those specified herein, and, respectively, aliphatic diol bis(3,4-epoxycyclohexanecarboxylates), e.g., diethylene glycol bis(3,4-epoxy-6-methylcyclohexanecarboxylate), aliphatic triol tris(3,4-epoxycyclohexanecarboxylates), e.g., 1,1,1-trimethylolpropane tris(3,4-epoxycyclohexanecarboxylates), bis(3,4-epoxycyclohexylmethyl) hydrocarbon dicarboxylates, e.g., bis(3,4-epoxy-1-methylcyclohexylmethyl) terephthalate, and 3,4-epoxycyclohexylmethyl epoxyalkanoates, e.g., 3,4-epoxy-6-methylcyclohexylmethyl 9,10-epoxystearate. Additional compositions which are useful in making resins having valuable properties can be made from polycarboxylic acid anhydrides and polyols, such as those specified herein, and, respectively, epoxidized butadiene polymers and copolymers and epoxidized olefinically unsaturated polyesters, e.g., an epoxidized 4-cyclohexene-1,2-dicarboxylic acid-polyhydric alcohol polyester.

Still other useful compositions and resins therefrom can be made from polycarboxylic acid anhydrides and polyols, such as those specified herein and such polyepoxides as, respectively, diglycidyl ether, butadiene dioxide, diglycidyl polyethers of polyhydric alcohols, diglycidyl dicarboxylates, e.g., diglycidyl maleate, diglycidyl succinate, polyepoxides of polyolefinic animal and vegetable oils, e.g., soybean oil epoxides, safflower seed oil epoxides and the like. Additional compositions which can form valuable resins can be made from polycarboxylic acid anhydrides and polyols, as hereinabove set forth, and, respectively, vinylcyclohexene dioxide and divinylbenzene dioxide. Compositions containing polycarboxylic acid anhydrides and polyols, such as those disclosed herein, and, respectively, dipentene dioxide and 1,2-5,6-diepoxycyclooctane are also useful in making new and valuable resins.

The following examples are presented. Room temperatures, wherever given, are temperatures in the range from 25° C. to 30° C. Barcol hardness values were determined at room temperature with a Barcol Impressor GYZJ 934–1. Heat distortion values and Izod impact values were determined in accordance with A.S.T.M. methods D-648-45T and D-256-47T, respectively.

EXAMPLE 1

A mixture was prepared from 2.76 grams of bis(2,3-epoxycyclopentyl) ether, 2.45 grams of maleic anhydride and 0.31 gram of ethylene glycol. The mixture contained amounts of bis(2,3-epoxycyclopentyl) ether, maleic anhydride and ethylene glycol such as to provide 1.67 carboxy equivalents of the anhydride and 0.33 hydroxy equivalent of the glycol for each epoxy equivalent of the ether. This mixture was warmed until it became homogeneous at a temperature not higher than 40° C. to 50° C. At a temperature within the range of 40° C. to 50° C. the mixture had a viscosity which was similar to water at room temperature. The mixture was maintained at about 120° C. for 14 minutes during which time a gel was formed. The gel was brought to and held at a temperature of about 160° C. for a period of 2 hours. After this period, a pale yellow, tough, infusible resin having a Barcol hardness of 17 was obtained.

EXAMPLE 2

A mixture containing 19.1 grams of bis(2,3-epoxycyclopentyl) ether, 13.7 grams of maleic anhydride and 2.2 grams of ethylene glycol was prepared. The amounts of bis(2,3-epoxycyclopentyl) ether, maleic anhydride and ethylene glycol contained by the mixture were such as to provide 1.33 carboxy equivalents of the anhydride and 0.33 hydroxy equivalent of the glycol for each epoxy equivalent of the ether. The mixture was warmed until it became homogeneous, occurring at a temperature of 40° C. to 50° C. The viscosity of the mixture at a temperature in the range of 30° C. to 45° C. was similar to that of water at room temperature. The mixture was raised to a temperature of 80° C. and held there for 6.75 hours during which time a gel was formed. The temperature of the gel was raised to 160° C. and maintained thereat for 6 hours. After this time the temperature was reduced to room temperature and a light amber, infusible resin having a Barcol hardness of 43 and an Izod impact of 0.3 at room temperature and a heat distortion temperature of 97° C. was obtained.

EXAMPLES 3 THROUGH 7

Five mixtures, each containing proportions of bis(2,3-epoxycyclopentyl) ether, maleic anhydride and ethylene glycol, as correspondingly listed in Table I below were prepared. The amounts of bis(2,3-epoxycyclopentyl) ether, maleic anhydride and ethylene glycol contained by the respective mixtures provided the carboxy equivalent and hydroxy equivalent per epoxy equivalent as correspondingly listed in Table I. To each mixture 1 drop of a benzyldimethylamine catalyst, said drop containing 0.05 weight percent of catalyst based upon the weight of mixture, was added. Each mixture was heated until it became homogeneous which occurred at a temperature of 40° C. to 50° C. The viscosity of the mixtures at temperatures within the above range were similar to the viscosity of water at room temperature. The mixtures were then heated to a temperature of 80° C. and held there for 5 hours. The temperature was then raised to 120° C. and maintained thereat for 1.5 hours, after which the temperature was again raised to 160° C. and held thereat for 6 hours. Gels formed from every mixture in the times listed in the table below. An infusible resin was obtained from each mixture having the physical properties correspondingly listed in Table I.

*Table I*

| Example No. | Carboxy equivalent per epoxy equivalent | Hydroxy equivalent per epoxy equivalent | Total gel time | | Barcol hardness | Heat distortion temperature | Izod impact |
|---|---|---|---|---|---|---|---|
| | | | Gel time, hours plus at 80° C. | Gel time, hours at 120° C. | | | |
| 3 | 1.00 | 0.33 | 5.00 | 0.50 | 47 | 117 | 0.4 |
| 4 | 1.33 | 0.33 | 4.88 | 0.00 | 49 | 117 | 0.4 |
| 5 | 1.67 | 0.33 | 4.82 | 0.00 | 51 | 111 | 0.4 |
| 6 | 2.00 | 0.33 | 5.00 | 0.25 | 51 | 95 | 0.3 |
| 7 | 2.33 | 0.33 | 5.00 | 0.17 | 46 | 76 | 0.5 |

EXAMPLES 8 THROUGH 29

Twenty-four mixtures, each containing 0.91 gram of bis(2,3-epoxycyclopentyl) ether and the amounts of maleic anhydride and ethylene glycol as correspondingly listed in Table II below, were prepared. Each of the mixtures, thus prepared, contained amounts of bis(2,3-epoxycyclopentyl) ether, maleic anhydride and ethylene glycol as to provide the carboxy equivalents of anhydride for each epoxy equivalent of bis(2,3-epoxycyclopentyl) ether and the aliphatic hydroxyl equivalents of the alcohol for each epoxy equivalent of bis(2,3-epoxycyclopentyl) ether as listed in Table II below. Each mixture was heated until it became homogeneous, occurring at about 50° C. The homogeneous mixtures, thus formed, had the viscosities, at a temperature of 40° C., which were similar to the viscosity of water at room temperature. The mixtures were then raised to a temperature of 120° C. and held there until gels were formed. Gels formed from each mixture in the times correspondingly listed in Table III below. Each gel was maintained at 120° C. for the times correspondingly listed in Table III. The gels were then raised to a temperature of 160° C. and held there for 6 hours. Infusible resins were obtained from each mixture. These resins had properties which are correspondingly listed in Table III.

*Table II*

| Example No. | Weight of maleic anhydride (grams) | Weight of ethylene glycol (grams) | Carboxy equivalents per epoxy equivalent ratio | Aliphatic hydroxyl equivalents per epoxy equivalent |
|---|---|---|---|---|
| 8 | 0.16 | 0.03 | 0.33 | 0.08 |
| 9 | 0.16 | 0.06 | 0.33 | 0.17 |
| 10 | 0.16 | 0.12 | 0.33 | 0.33 |
| 11 | 0.32 | 0.06 | 0.67 | 0.17 |
| 12 | 0.32 | 0.12 | 0.67 | 0.33 |
| 13 | 0.48 | 0.06 | 1.00 | 0.17 |
| 14 | 0.48 | 0.12 | 1.00 | 0.33 |
| 15 | 0.64 | 0.12 | 1.33 | 0.33 |
| 16 | 0.80 | 0.12 | 1.67 | 0.33 |
| 17 | 0.96 | 0.12 | 2.00 | 0.33 |
| 18 | 1.12 | 0.12 | 2.33 | 0.33 |
| 19 | 1.28 | 0.12 | 2.67 | 0.33 |
| 20 | 1.44 | 0.12 | 3.00 | 0.33 |
| 21 | 1.60 | 0.12 | 3.33 | 0.33 |
| 22 | 1.76 | 0.12 | 3.67 | 0.33 |
| 23 | 0.80 | 0.36 | 1.67 | 1.00 |
| 24 | 0.80 | 0.48 | 1.67 | 1.33 |
| 25 | 0.80 | 0.60 | 1.67 | 1.67 |
| 26 | 1.76 | 0.36 | 3.67 | 1.00 |
| 27 | 1.76 | 0.48 | 3.67 | 1.33 |
| 28 | 1.76 | 0.60 | 3.67 | 1.67 |
| 29 | 1.76 | 0.72 | 3.67 | 2.00 |

Table III

| Example No. | Gel time at 120° C. (minutes) | Cure at 120° C. (hours) | Resin description at room temperature |
|---|---|---|---|
| 8 | 210 | 10.5 | Amber, tough, Barcol hardness of 0. |
| 9 | 178 | 10.5 | Do. |
| 10 | 178 | 10.5 | Pale-amber, Barcol hardness of 0. |
| 11 | 65 | 2.0 | Amber, tough, Barcol hardness of 34. |
| 12 | 38 | 2.0 | Yellow, tough, Barcol hardness of 34. |
| 13 | 33 | 2.0 | Amber, Barcol hardness of 42. |
| 14 | 33 | 2.0 | Pale-amber, Barcol hardness of 41. |
| 15 | 18 | 2.0 | Pale-amber, Barcol hardness of 48. |
| 16 | 18 | 2.0 | Yellow, Barcol hardness of 47. |
| 17 | 13 | 2.0 | Pale-amber, Barcol hardness of 45. |
| 18 | 13 | 2.0 | Amber, Barcol hardness of 41. |
| 19 | 13 | 2.0 | Amber, Barcol hardness of 39. |
| 20 | 8 | 2.0 | Amber, tough, Barcol hardness of 0. |
| 21 | 8 | 2.0 | Do. |
| 22 | 3 | 2.0 | Do. |
| 23 | 5 | 7.0 | Yellow, Barcol hardness of 36. |
| 24 | 120 | 7.0 | Yellow, tough, Barcol hardness of 0. |
| 25 | 180 | 7.0 | Do. |
| 26 | 135 | 7.0 | Yellow, hard. |
| 27 | 180 | 7.0 | Do. |
| 28 | 180 | 7.0 | Do. |
| 29 | 180 | 7.0 | Do. |

EXAMPLE 30

A mixture was prepared from 2.76 grams of bis(2,3-epoxycyclopentyl) ether, 2.45 grams of maleic anhydride and 2.00 grams of polyethylene glycol having an average molecular weight of 400. This mixture contained such amounts of bis(2,3-epoxycyclopentyl) ether, maleic anhydride and polyethylene glycol as provided 1.67 carboxy equivalents of the anhydride and 0.33 hydroxyl equivalents of the glycol for each epoxy equivalent of the ether. The mixture was heated to a temperature between 40° C. and 50° C. and stirred to form a homogeneous mixture. This mixture was then raised to a temperature of 120° C. and held thereat for 5.75 hours. A gel was formed after 2.5 hours at this temperature. The gel was then maintained at 160° C. for an additional 6 hours. A pale-yellow, tough, flexible, infusible resin was formed.

EXAMPLE 31

A mixture was prepared from 0.91 gram of bis(2,3-epoxycyclopentyl) ether, 2.47 grams of chlorendic anhydride and 0.17 gram of polyethylene glycol having an average molecular weight of about 400. This mixture contained such amounts of bis(2,3-epoxycyclopentyl) ether, chlorendic anhydride and polyethylene glycol as provided 1.33 carboxy equivalents of the anhydride and 0.085 hydroxyl equivalent of the glycol for each epoxy equivalent of the ether. The mixture temperature was raised to 50° C. to 60° C. and a homogeneous mixture was obtained. The temperature of this mixture was raised to 120° C. and held thereat for 6.45 hours. A gel was formed within 45 minutes at 120° C. The gel was cured for 6 additional hours at 160° C. A tough, infusible resin having a Barcol hardness of 35 was obtained.

EXAMPLES 32 THROUGH 36

Five mixtures were prepared. Each mixture contained 0.91 gram of bis(2,3-epoxycyclopentyl) ether and the amounts of various anhydrides and polyhydric alcohols as correspondingly listed in Table IV below. Each mixture contained such amounts of bis(2,3-epoxycyclopentyl) ether, polycarboxylic acid anhydrides and polyhydric alcohols as provided 1.33 carboxy equivalents of anhydride and 0.33 aliphatic hydroxyl equivalent of the polyhydric alcohol for each epoxy equivalent of the bis(2,3-epoxycyclopentyl) ether. The mixtures were warmed until they became homogeneous, occurring at temperatures between 40° C. and 100° C. The viscosity of each mixture, at these temperatures, was similar to the viscosity of water at room temperature. Each mixture was raised to a temperature of 120° C. and held there until gels were formed. Gels were formed from each mixture in the times correspondingly listed in Table IV. The mixtures were maintained at 120° C. for periods of time, including the gel times, correspondingly listed in Table IV under the heading of "Total Cure at 120° C." The gel of Example 34 was heated to and held at 160° C. for 4 hours. The other gels were each raised to a temperature of 160° C. and held there for 6 hours. Infusible resins were obtained from each mixture. These resins were cooled to room temperature and were found to have the properties correspondingly listed in Table IV.

Table IV

| Example No. | Polycarboxylic acid anhydride | Grams of anhydride | Polyhydric alcohol | Grams of polyhydric alcohol | Gel time at 120° C. (hours) | Total cure at 120° C. (hours) | Resin properties |
|---|---|---|---|---|---|---|---|
| 32 | Phthalic anhydride | 0.99 | Polyethylene glycol (average molecular weight of 200). | 0.33 | 1.67 | 65.0 | Tough, Barcol hardness of 37. |
| 33 | Methyltetrahydrophthalic anhydride. | 1.00 | Polyethylene glycol (average molecular weight of 400). | 0.66 | 11.00 | 15.0 | Hard. |
| 34 | Maleic anhydride | 0.65 | Glycerol | 0.10 | 0.57 | 2.0 | Tough, Barcol hardness of 53. |
| 35 | Polyadipic anhydride | 0.84 | ----do---- | 0.15 | 4.50 | 6.5 | Tough, flexible. |
| 36 | Succinic anhydride | 0.67 | ----do---- | 0.15 | 1.00 | 6.5 | Do. |

EXAMPLES 37 THROUGH 42

Six mixtures, each containing 0.91 gram of bis(2,3-epoxycyclopentyl) ether, 0.74 gram of phthalic anhydride and 0.33 gram of polyethylene glycol having an average molecular weight of about 200, were prepared. Each mixture contained such amount of bis(2,3-epoxycyclopentyl) ether, phthalic anhydride and polyethylene glycol as to provide one carboxy equivalent of anhydride and 0.33 aliphatic hydroxyl equivalent of the polyethylene glycol for each epoxy equivalent of the bis(2,3-epoxycyclopentyl) ether. Various acidic and basic catalysts were added to each mixture. The mixtures were then warmed to a temperature of about 100° C. whereupon they became homogeneous. They were then heated to a temperature of 120° C. and were held there until gels were formed. Gels were formed from each mixture in the times correspondingly listed in Table V below.

Table V

| Example No. | Catalyst | Weight of catalyst (grams) | Weight percent of catalyst | Gel time at 120° C. (minutes) |
|---|---|---|---|---|
| 37 | Potassium hydroxide (as a 20 weight percent solution in methanol). | 0.004 | 0.44 | 156 |
| 38 | Dimethylbenzylamine (as a 25 weight percent solution in ethyl acetate). | 0.005 | 0.55 | 108 |
| 39 | Sulfuric acid (as a 25 weight percent aqueous solution). | 0.005 | 0.55 | 20 |
| 40 | Stannic tetrachloride (as a 25 weight percent solution in ethyl acetate). | 0.005 | 0.55 | 4 |
| 41 | Borontrifluoride-piperidine complex. | 0.039 | 4.2 | 1 |
| 42 | None | | | 192 |

EXAMPLES 43 THROUGH 46

Four mixtures, each containing 0.91 gram of bis(2,3-epoxycyclopentyl) ether, an amount of polycarboxylic acid anhydride as correspondingly listed in Table VI below and an amount of polyhydric phenol also as correspondingly listed in Table VI, were prepared. Each mixture contained such amounts of bis(2,3-epoxycyclopentyl) ether, polycarboxylic acid anhydride and polyhydric phenol as provided the number of carboxy equivalents of the anhydride and the number of hydroxyl equivalents of the phenol for each epoxy equivalent of the ether correspondingly listed in Table VI. Each mixture was warmed until it became homogeneous and then heated to 120° C. They were held at 120° C. for 5.3 hours and then were maintained at 160° C. for an additional 6 hours. Light amber, infusible resins having the properties correspondingly listed in Table VI were obtained.

Table VI

| Example No. | Polycarboxylic anhydride | Grams of anhydride | Polyhydric phenol | Grams of phenol | Carboxy equivalents per epoxy equivalent | Hydroxyl equivalent per epoxy equivalent | Gel time at 120° C. (hours) | Properties of resin |
|---|---|---|---|---|---|---|---|---|
| 43 | Maleic anhydride | 0.49 | Polyhydric condensation product of p-tertiary-butylphenol and formaldehyde (average molecular weight of about 798). | 0.19 | 1.00 | 0.20 | 5.33 | Tough, Barcol hardness of 42. |
| 44 | Phthalic anhydride | 0.37 | Trimethylolphenol | 0.23 | 0.50 | 0.50 | 1.67 | Tough, Barcol hardness of 38. |
| 45 | Succinic anhydride | 0.38 | Resorcinol | 0.13 | 0.75 | 0.25 | 3.65 | Tough, Barcol hardness of 41. |
| 46 | Chlorendic anhydride. | 0.93 | Bisphenol A | 0.34 | 0.50 | 0.30 | 0.50 | Tough, Barcol hardness of 34. |

EXAMPLE 47

A mixture was prepared from 0.91 gram of bis(2,3-epoxycyclopentyl) ether, 0.3 gram of phthalic anhydride and 0.31 gram of 1,2,6-hexanetriol. This mixture contained such amounts of bis(2,3-epoxycyclopentyl) ether, phthalic anhydride and 1,2,6-hexanetriol as to provide 0.4 carboxy equivalent of the anhydride and 0.7 hydroxyl equivalent of the triol for each epoxy equivalent of the ether. To the mixture 0.02 gram of piperidine-borontrifluoride complex catalyst (representing 1.0 weight percent based on the weight of mixture) was added. The mixture was heated to a temperature not higher than 100° C. and became homogeneous. The temperature of the mixture was then raised to 120° C. and maintained thereat for 2½ hours. A gel formed within the first 12 minutes of heating at 120° C. Then the temperature of the mixture was raised to 160° C. and held thereat for 6 hours. A brown, tough, infusible resin having a Barcol hardness of 35 was obtained.

EXAMPLE 48

A mixture containing 0.91 gram of bis(2,3-epoxycyclopentyl) ether, 0.3 gram of phthalic anhydride and 0.31 gram of 1,2,6-hexanetriol was prepared. This mixture contained such amounts of bis(2,3-epoxycyclopentyl) ether, phthalic anhydride and 1,2,6-hexanetriol as to provide 0.4 carboxy equivalent of the anhydride and 0.7 hydroxyl equivalent of the triol for each epoxy group of the ether. The mixture was heated to a temperature of less than 100° C. and became homogeneous. The temperature of the mixture was then raised to 120° C. and maintained thereat for 8 hours, during the first 6½ hours of which a gel was formed. The temperature was then raised to 160° C. and then held thereat for 6 hours. A pale amber, tough, infusible resin having a Barcol hardness of 22 was obtained.

EXAMPLE 49

A mixture was prepared from 0.91 gram of bis(2,3-epoxycyclopentyl) ether, 0.1 gram of maleic anhydride and 0.6 gram of allyl 2,4,6-trimethylolphenyl ether. This mixture contained such amounts of bis(2,3-epoxycyclopentyl) ether, maleic anhydride and allyl 2,4,6-trimethylolphenyl ether as provided 0.2 carboxy equivalent of the anhydride and 0.8 hydroxyl equivalent of the polyol for each epoxy equivalent of the ether. The mixture was warmed to a temperature of 40° C. to 50° C. and became homogeneous. The temperature of the mixture was raised to and held at 120° C. for 8 hours, during the first 6½ hours thereof a gel was formed. The temperature was increased to 160° C. and held thereat for 6 hours. A pale yellow, tough, flexible, infusible resin was obtained.

EXAMPLE 50

A mixture was prepared from 2.73 grams of bis(2,3-epoxycyclopentyl) ether, 1.38 grams of maleic anhydride and 0.32 gram of ethylene glycol. This mixture contained such amounts of bis(2,3-epoxycyclopentyl) ether, maleic anhydride and ethylene glycol as to provide 1.00 carboxy equivalent of the anhydride and 0.33 hydroxyl equivalent of the glycol for each epoxy equivalent of the ether. The mixture was heated to about 45° C. and became homogeneous at this temperature. The mixture temperature was raised to 120° C. and held thereat for a period of 9 hours, during the first 65 minutes of which a gel was formed. The gel then was raised to a temperature of 160° C. and maintained thereat for 4 hours. A yellow, tough, infusible resin having a Barcol hardness of 46 was obtained.

What is claimed is:

1. A curable composition comprising bis(2,3-epoxycyclopentyl) ether, a polycarboxylic acid anhydride, and a polyol selected from the group consisting of polyhydric alcohols and polyhydric phenols, in such relative amounts so as to provide from about 0.33 to 4.0 carboxy equivalents of said polycarboxylic acid anhydride and up to 3.0 hydroxyl equivalents of said polyol per epoxy equivalent of said bis(2,3-epoxycyclopentyl) ether.

2. An infusible solid product obtained by reacting, at elevated temperatures, the curable composition defined in claim 1.

3. A curable composition comprising bis(2,3-epoxycyclopentyl) ether, a polycarboxylic acid anhydride, and a polyol selected from the group consisting of polyhydric alcohols and polyhydric phenols, in such relative amounts so as to provide from 0.67 to 3.0 carboxy equivalents of said polycarboxylic acid anhydride and from 0.16 to 1.67 hydroxyl equivalents of said polyol per epoxy equivalent of said bis(2,3-epoxycyclopentyl) ether.

4. An infusible solid product obtained by reacting, at elevated temperatures, the curable composition defined in claim 3.

5. An infusible solid product obtained by reacting, at elevated temperatures, an admixture comprising bis(2,3-epoxycyclopentyl) ether, maleic anhydride and glycerol, in such relative amounts so as to provide from 0.67 to 3.0 carboxy equivalents of said maleic anhydride and from 0.16 to 1.67 hydroxyl equivalents of said glycerol per epoxy equivalent of said bis(2,3-epoxycyclopentyl) ether.

6. An infusible solid product obtained by reacting, at elevated temperatures, an admixture comprising bis(2,3-epoxycyclopentyl) ether, succinic anhydride, and glycerol, in such relative amounts so as to provide from 0.67 to 3.0 carboxy equivalents of said succinic anhydride and from 0.16 to 1.67 hydroxyl equivalents of said glycerol per epoxy equivalent of said bis(2,3-epoxycyclopentyl) ether.

7. An infusible solid product obtained by reacting, at elevated temperatures, an admixture comprising bis(2,3-epoxycyclopentyl) ether, maleic anhydride and ethylene glycol, in such relative amounts so as to provide from 0.67 to 3.0 carboxy equivalents of said maleic anhydride and from 0.16 to 1.67 hydroxyl equivalents of said ethylene glycol per epoxy equivalent of said bis(2,3-epoxycyclopentyl) ether.

8. An infusible solid product obtained by reacting, at elevated temperatures, an admixture comprising bis(2,3-epoxycyclopentyl) ether, phthalic anhydride, and 1,2,6-hexanetriol, in such relative amounts so as to provide from 0.67 to 3.0 carboxy equivalents of said phthalic anhydride and from 0.16 to 1.67 hydroxyl equivalents of said 1,2,6-hexanetriol per epoxy equivalent of said bis(2,3-epoxycyclopentyl) ether.

9. An infusible solid product obtained by reacting, at elevated temperatures, an admixture comprising bis(2,3-epoxycyclopentyl) ether, succinic anhydride, and resorcinol, in such relative amounts so as to provide from 0.67 to 3.0 carboxy equivalents of said succinic anhydride and from 0.16 to 1.67 hydroxyl equivalents of said resorcinol per epoxy equivalent of said bis(2,3-epoxycyclopentyl) ether.

References Cited in the file of this patent

UNITED STATES PATENTS

| | | |
|---|---|---|
| 2,609,357 | Koroly | Sept. 2, 1952 |
| 2,720,500 | Cody | Oct. 11, 1955 |
| 2,739,161 | Carlson | Mar. 20, 1956 |
| 2,921,925 | Phillips et al. | Jan. 19, 1960 |

OTHER REFERENCES

"The Condensed Chemical Dictionary," 5th edition (1956), Reinhold Pub. Corp., New York.